US009996622B2

(12) United States Patent
Lyndersay et al.

(10) Patent No.: US 9,996,622 B2
(45) Date of Patent: Jun. 12, 2018

(54) BROWSER NEW TAB PAGE GENERATION FOR ENTERPRISE ENVIRONMENTS

(71) Applicant: Microsoft Technology Licensing, LLC, Redmond, WA (US)

(72) Inventors: Sean O. Lyndersay, Sammamish, WA (US); Martin J. Hall, Seattle, WA (US); Michael J. Patten, Sammamish, WA (US); Joshua T. Stickler, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 436 days.

(21) Appl. No.: 14/615,723

(22) Filed: Feb. 6, 2015

(65) Prior Publication Data

US 2016/0232240 A1    Aug. 11, 2016

(51) Int. Cl.
*G06F 17/30* (2006.01)
*G06F 3/0482* (2013.01)
*G06F 3/0483* (2013.01)
*H04L 29/08* (2006.01)

(52) U.S. Cl.
CPC ...... *G06F 17/30867* (2013.01); *G06F 3/0482* (2013.01); *G06F 3/0483* (2013.01); *G06F 17/3089* (2013.01); *G06F 17/30554* (2013.01); *G06F 17/30887* (2013.01); *G06F 17/30893* (2013.01); *H04L 67/02* (2013.01)

(58) Field of Classification Search
CPC combination set(s) only.
See application file for complete search history.

(56) References Cited

U.S. PATENT DOCUMENTS

| 6,327,628 B1 | 12/2001 | Anuff et al. |
| 7,051,045 B2 | 5/2006 | Cirinna et al. |
| 7,698,407 B2 | 4/2010 | Mattox et al. |

(Continued)

OTHER PUBLICATIONS

"Yammer Full Feature List", Published on: Sep. 9, 2013, Available at: https://about.yammer.com/product/feature-list/, 14 pages.
"Portals Enhance Access to Information—But Where is the Information?", In South African Journal of Information Management, vol. 5, No. 1, Mar. 2003, 3 pages.
Detlor, Brian, "The Corporate Portal as Information Infrastructure: Towards a Framework for Portal Design", In International Journal of Information Management, vol. 20, No. 2, Apr. 2000, pp. 91-101.
"Introducing Delve (codename Oslo) and the Office Graph", Published on: Mar. 11, 2014, Available at: http://blogs.office.com/2014/03/11/introducing-codename-oslo-and-the-office-graph/, 9 pages.

(Continued)

*Primary Examiner* — Shyue Jiunn Hwa
(74) *Attorney, Agent, or Firm* — Fiala & Weaver P.L.L.C.

(57) ABSTRACT

Systems, methods and computer program products are described that enable a web browser to automatically determine that a user thereof is logged into an enterprise network and, based on at least this determination, present the user with a new tab page or similar interface that includes features that facilitate access by the user to enterprise-related content. The enterprise-related content may include, for example, enterprise-related web sites, content shared by colleagues, content trending among team members, documents that the user recently worked on, enterprise-related news, and industry-related news. In response to determining that the user is logged into the enterprise network, embodiments described herein also enable the web browser to present recommended information resources to the user, wherein the recommended information resources may include information resources that are accessible internally with respect to the enterprise network as well as information resources that are accessible externally with respect to the enterprise network.

20 Claims, 10 Drawing Sheets

(56) References Cited

U.S. PATENT DOCUMENTS

| | | | |
|---|---|---|---|
| 7,765,166 | B2 | 7/2010 | Beringer et al. |
| 8,538,822 | B1* | 9/2013 | Meiresonne ....... G06Q 30/0277 705/26.1 |
| 2003/0078830 | A1 | 4/2003 | Wagner et al. |
| 2003/0195970 | A1* | 10/2003 | Dinh .................... H04L 63/083 709/229 |
| 2005/0097180 | A1 | 5/2005 | Abdelhak |
| 2013/0110868 | A1 | 5/2013 | Hatakeda et al. |
| 2014/0068589 | A1 | 3/2014 | Barak |
| 2014/0136531 | A1 | 5/2014 | Aflalo et al. |
| 2015/0100377 | A1* | 4/2015 | Penumaka ......... G06Q 30/0201 705/7.29 |
| 2016/0179962 | A1* | 6/2016 | Patten ................ G06F 17/3053 707/706 |

OTHER PUBLICATIONS

"International Search Report and Written Opinion Issued in PCT Application No. PCT/US2016/015867", dated Apr. 18, 2016, 14 Pages.

"Corporate Intranets. Intranet—Employee Home Page", Retrieved from <<https://web.archive.org/web/20140528102313/http://totaldatasolutions.com.au/images/intranet-employee-page.jpg>>, May 28, 2014, 1 Page.

* cited by examiner

BROWSER NEW TAB PAGE GENERATION FOR ENTERPRISE ENVIRONMENTS

BACKGROUND

A web browser is a software application that is commonly used for retrieving, presenting and traversing information resources on the World Wide Web. Each information resource is identified by a Uniform Resource Locator (URL) and may be a web page, an image, a video, or other piece of content. Hyperlinks present in information resources enable users to easily navigate their web browsers to related information resources. Examples of modern web browsers include but are not limited to INTERNET EXPLORER®, published by Microsoft Corporation of Redmond, Washington, CHROME™, published by Google Inc. of Mountain View, Calif., FIREFOX®, published by the Mozilla Foundation of Mountain View, Calif., and SAFARI®, published by Apple Inc. of Cupertino, Calif. Although web browsers are often used to navigate the World Wide Web, they can also be used to access information provided by web servers in private networks (e.g., enterprise networks) or files in file systems.

Some web browsers are designed to present users with a so-called "new tab page" when the user first launches the web browser and/or when the user opens a new tab within the web browser graphical user interface (GUI). The new tab page typically includes features that make it easy for users to complete common browsing tasks and is designed to help users access the information resources in which they are most interested. Traditionally, new tab page features have been limited to a search box that the user can use to submit queries to a search engine and links to a set of web sites that have been frequently visited by the user. New tab page features are typically consumer-oriented.

Conventional web browsers do not provide enterprises with an easy way to disseminate corporate information to their employees. Instead, many enterprises develop their own corporate web pages for this purpose. These corporate web pages may be set as the default home page on employees' web browsers. Developing and maintaining such corporate home pages can consume a significant amount of time and effort, particularly on the part of an enterprise's information technology (IT) department.

For enterprises that provide their employees with access to a web browser, there is often a concern that employees will spend an excessive amount of work time browsing the Internet for non-work-related purposes. To address this issue, some corporate IT departments place restrictions on the web sites that employees can access with their web browsers. For example, some corporate IT departments may restrict access to a set of internal web sites only and/or to a limited set of external web sites. Employees may not appreciate having their browsing freedom curtailed in this manner.

SUMMARY

Systems, methods and computer program products are described herein that enable a web browser to automatically determine that a user thereof is logged into an enterprise network and then, based on at least this determination, present the user with a new tab page or similar interface that includes features that facilitate access by the user to enterprise-related content. The enterprise-related content may include, for example and without limitation, enterprise-related web sites, content shared by colleagues, content trending among team members, documents that the user recently worked on, enterprise-related news, and industry-related news. In response to determining that the user is logged into the enterprise network, embodiments described herein can also enable the web browser to present recommended information resources to the user via the new tab page, wherein the recommended information resources may include information resources that are accessible internally with respect to the enterprise network as well as information resources that are accessible externally with respect to the enterprise network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
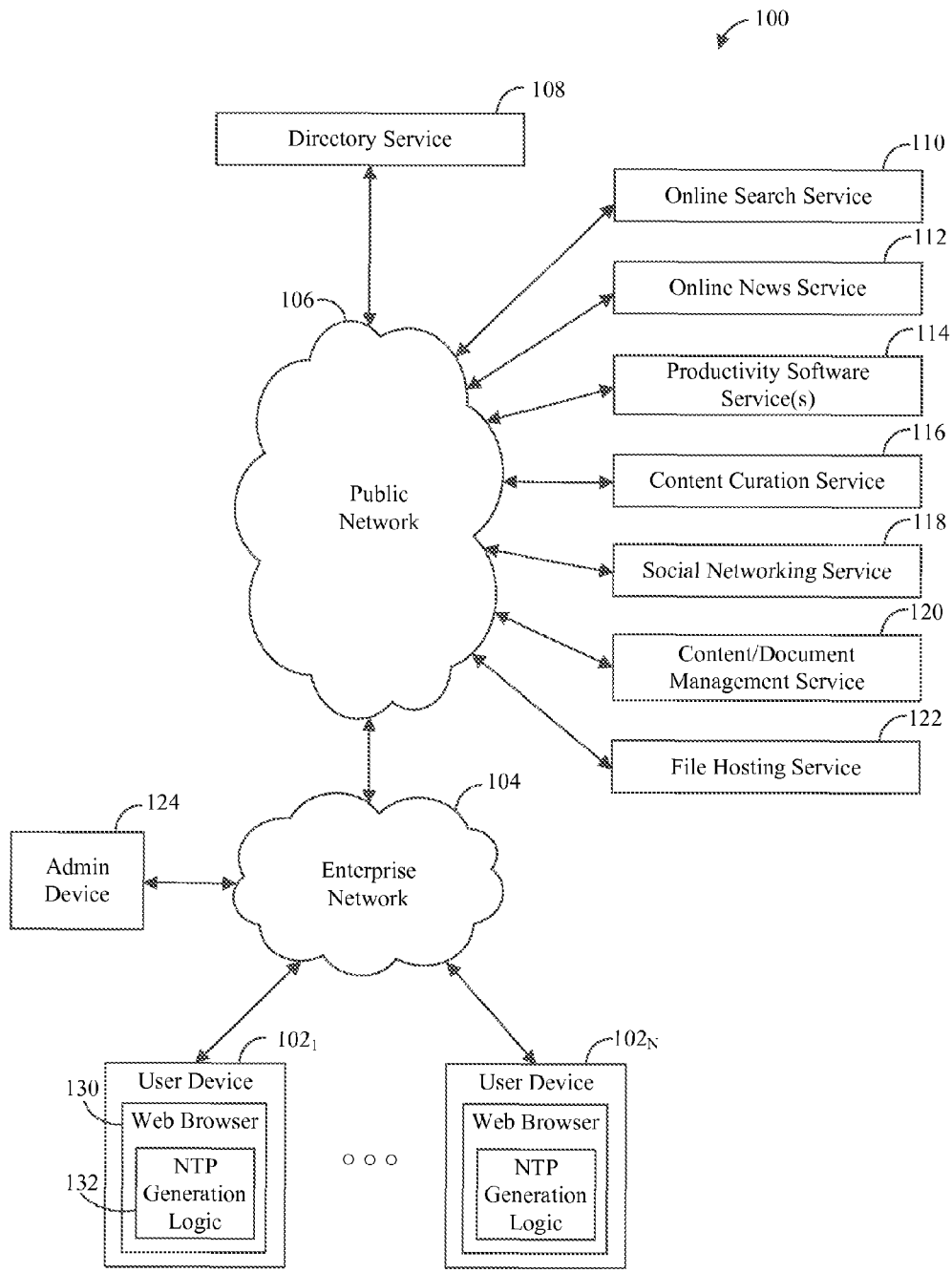
FIG. 1 is a block diagram of an example system that enables a web browser to provide a user with access to enterprise-related content via a new tab page in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Systems, methods and computer program products are described herein that enable a web browser to automatically determine that a user thereof is logged into an enterprise network and then, based on at least this determination, present the user with a new tab page or similar interface that includes features that facilitate access by the user to enterprise-related content. The enterprise-related content may include, for example and without limitation, enterprise-related web sites, content shared by colleagues, content trending among team members, documents that the user recently worked on, enterprise-related news, and industry-related news.

In an embodiment, when an enterprise user causes the web browser to create a new tab page, the web browser presents the user with a version of the new tab page that is tailored for the enterprise to which the user belongs. This enterprise version of the new tab page may provide the user with instant access to files, documents, or other content being viewed, accessed or shared by the user's colleagues and/or team members, as well as news items related to the enterprise or the industry to which the enterprise belongs. Furthermore, corporate data may be presented or accessed directly from within the enterprise version of the new tab page. In further accordance with certain embodiments, the enterprise version of the new tab page enables users thereof to instantly discover enterprise-related content and provides such users with access to some of the most common tasks for the enterprise, thereby enabling them to complete enterprise-related tasks more quickly.

The foregoing features may be presented in conjunction with more traditional new tab page features, such as a search box via which the user can submit queries to a search engine and links to frequently-accessed web sites. As will also be discussed herein, the search box can be configured to search across both intranet enterprise content as well as external Internet content when it is determined that the user is logged into an enterprise network.

In one embodiment, the web browser may be configured to present recommended information resources to an enterprise user via the new tab page, wherein the recommended information resources may include information resources that are accessible internally with respect to the enterprise network as well as information resources that are accessible externally with respect to the enterprise network. Such recommended information resources may be presented within a drop-down menu of a search box of the new tab page, or via some other interface component of the new tab page.

In accordance with further embodiments, an enterprise IT department (or other entity) is enabled to customize the enterprise version of the new tab page. Via such customization, the IT department can provide enterprise employees with access to specific web sites and news information directly from the new tab page. For example, the IT department can provide a new tab page channel feed that displays links to internal web sites (e.g., a human resources (HR) web site), time cards, payroll, news, corporate events, or the like.

In accordance with still further embodiments, content on the enterprise version of the new tab page may be rendered using a familiar magazine layout in which content is grouped into logical categories, which may be referred to herein as channels. The channel(s) that are displayed on the new tab page for a particular enterprise user may depend on the services the user has access to, which enterprise account the user is signed into, and/or what customization the IT department has performed. Thus, the layout of the new tab page may be dynamically generated based on such information. New channels can be added over time, and in certain embodiments the user can customize their experience by providing feedback on the content shown.

As noted in the Background Section above, conventional web browsers do not provide enterprises with an easy way to disseminate corporate information to their employees. Instead, many enterprise IT departments develop their own corporate web pages for this purpose. Developing and maintaining such corporate home pages can consume a significant amount of time and effort. In contrast, embodiment described herein provide IT departments with a simple "out of the box" solution to providing employees with access to enterprise-related content that leverages the commonly-accessed new tab page of the employees' web browsers.

By enabling an enterprise user to more quickly locate desired content such as web pages, documents, and the like, the embodiments described herein can improve the performance of the computing device running the web browser by, for example, reducing power consumption, processor utilization, and network utilization by the device. This is because less time must be spent browsing to obtain desired information. Furthermore, by enabling enterprise users to more quickly locate desired content, the embodiments described herein can reduce the utilization of enterprise network resources as well.

In the following sections, embodiments of the aforementioned systems, methods and computer program products will be more fully described. In particular, Section II describes systems, methods and computer program products that enable a web browser to provide an enterprise user with access to enterprise-related content via a new tab page. Section III describes an example mobile device that may be used to implement various embodiments. Section IV describes an example processor-based computer system that may be used to implement various embodiments. Section V describes some additional exemplary embodiments. Section VI provides some concluding remarks.

II. Enabling a Web Browser to Provide an Enterprise User with Access to Enterprise-related Content via a New Tab Page FIG. 1 is a block diagram of an example system 100 that enables a web browser to provide an enterprise user with access to enterprise-related content. The web browser may provide the enterprise user with access to the enterprise-related content via, for example, a new tab page or similar interface.

As shown in FIG. 1, system 100 includes a plurality of user devices $102_1$-$102_N$ and at least one administrator device 124, each of which is communicatively connected to an enterprise network 104. Enterprise network 104 is in turn communicatively connected to a public network 106. Also communicatively connected to public network 106 are a directory service 108, an online search service 110, an online news service 112, one or more productivity software services 114, a content curation service 116, a social networking service 118, a content/document management service 120, and a file hosting service 122. Each of these elements of system 100 will now be described.

User devices $102_1$-$102_N$ are intended to represent devices utilized by or otherwise accessible to members of an enterprise. As used herein, the term "enterprise" broadly refers to any of a wide variety of organization types, including businesses, non-profit organizations, and government agencies. Users of user devices $102_1$-$102_N$ may be referred to herein as "enterprise users" or simply "users". Each of user devices $102_1$-$102_N$ may comprise, for example and without limitation, a desktop computer, a laptop computer, a tablet computer, a netbook, a smartphone, or the like. An example mobile device that may be used to implement any one of user devices $102_1$-$102_N$ will be described below in reference to FIG. 9. An example processor-based computer system that may be used to implement any one of user devices $102_1$-$102_N$ will be described below in reference to FIG. 10.

Each of user devices $102_1$-$102_N$ is communicatively connected to enterprise network 104. Enterprise network 104 comprises a private computer network established by an enterprise for the purposes of interconnecting enterprise devices (e.g., computing devices at one or more enterprise locations) to other enterprise devices and to enable enterprise devices to share computing resources.

Administrator device 124 is also connected to enterprise network 104. Administrator device 124 is intended to represent an electronic device utilized by or otherwise accessible to an administrator (e.g., an IT administrator) or other person within an enterprise who may be responsible for deploying, maintaining and/or configuring hardware and/or software resources on behalf of enterprise users. Administrator device 124 may be implemented in a like manner to any of user devices $102_1$-$102_N$ as described above. For example and without limitation, administrator device 124 may comprise a desktop computer, a laptop computer, a tablet computer, a netbook, or the like.

Enterprise network 104 is communicatively connected to public network 106 via one or more networking devices (not shown in FIG. 1). Such networking devices enable user devices $102_1$-$102_N$ and administrator device 124 to communicate with various entities on public network 106. However, user devices $102_1$-$102_N$, administrator device 124, and other computing devices/resources within enterprise network 104 are not visible to such entities on public network 106. The operation of and interaction between private and public networks is well known to those skilled in the relevant art(s) and thus further details concerning this subject will not be provided herein for the sake of brevity. In one embodiment, public network 106 comprises the Internet.

In system 100, a directory service 108 is utilized to manage the authentication of users who attempt to log into enterprise network 104 via any of user devices $102_1$-$102_N$ or administrator device 124. Secure connections are utilized to carry out communication between the enterprise devices and directory service 108 via public network 106. In an embodiment, directory service 108 comprises a cloud-based directory service. In a particular embodiment, directory service 108 comprises AZURE™ ACTIVE DIRECTORY®, a cloud-based service offered by Microsoft Corporation.

Other services that may be accessed by user devices $102_1$-$102_N$, include, for example, online search service 110 and online news service 112. Online search service 110 comprises a service that employs search engine technology to conduct searches for information resources on behalf of users (e.g., based on user-submitted queries or other input) and to provide users with access to such information resources. Online search service 110 may provide other services as well (e.g., maps, speech recognition, translation, etc.). One example of search service 110 comprises BINGO®, offered by Microsoft Corporation. Other well-known search engines/services include GOOGLE™ search, offered by Google Inc., and YAHOO!® search, offered by Yahoo! Inc. of Sunnyvale Calif. As will be discussed herein, in embodiments, intranet searches across enterprise content may also be supported.

Online news service 112 comprises a service that aggregates and delivers news-related content on demand. One example of online news service 112 comprises MSN®, offered by Microsoft Corporation.

System 100 also includes a number of other services that may accessed by user devices $102_1$-$102_N$, including productivity software service(s) 114, content curation service 116, social networking service 118, content/document management service 120 and file hosting service 122. In embodiments, one or more of these services are provided to enterprise users in return for payment by the enterprise. For example, one or more of these services may be provided on a subscription basis, although this example is not intended to be limiting. In further embodiments, one or more of these services comprises a cloud-based service.

Productivity software service(s) 114 comprise one or more services that enable users of user devices $102_1$-$102_N$ to produce information, such as documents, presentations, worksheets, databases, charts, graphs, and the like. Productivity software service(s) 114 may comprise a suite of applications that may be accessed on-line and/or downloaded to a user device $102_1$-$102_N$. Such services may include but are not limited to a word processing application (e.g., MICROSOFT® WORD, offered by Microsoft Corporation) a spreadsheet application (e.g., EXCEL®, offered by Microsoft Corporation), a presentation application (e.g., POWERPOINT®, offered by Microsoft Corporation), a note-taking and note-management application (e.g., ONENOTE®, offered by Microsoft Corporation), an e-mail application (e.g., OUTLOOK®, offered by Microsoft Corporation), an instant messaging application (LYNC®, offered by Microsoft Corporation), or the like. In one embodiment, productivity software service(s) 114 may comprise part of a suite of cloud-based software services, such as OFFICE 365™, offered by Microsoft Corporation.

Content curation service 116 comprises a service that utilizes machine learning and artificial intelligence to identify, organize, and present content to a user that is likely to be relevant to such user. Such content may be selected, for example, based on what a user is working on and on actions taken by people in the user's network. For example, in an embodiment, such content may be identified by at least analyzing utilization of other enterprise-related services by the user and others in his/her network, such as productivity software service(s) 114, social network service 118, content/document management service 120 and file hosting service 122. In a particular embodiment, content curation service 116 operates in part by mapping relationships between people, content, and activity across enterprise user accounts associated with a suite of cloud-based software services, such as OFFICE 365™. In one embodiment, content curation service 116 comprises MICROSOFT® OFFICE GRAPH™, offered by Microsoft Corporation.

Social networking service 118 comprises a service that facilitates private connection, communication and information sharing between members of an enterprise, such as the users of user devices $102_1$-$102_N$. In one embodiment, social networking service 118 comprises YAMMER™, offered by Yammer, Inc., a subsidiary of Microsoft Corporation.

Content/document management service 120 comprises a web application framework and platform that integrates intranet portal, enterprise content management and enterprise document management services. In one embodiment, content/document management service 120 comprises SHAREPOINT®, offered by Microsoft Corporation.

File hosting service 122 comprises a service that allows users of user devices $102_1$-$102_N$ to upload and synchronizes files to a cloud storage and then access them from a web browser on their local device. In one embodiment, file hosting service 122 comprises ONEDRIVE™ FOR BUSINESS, offered by Microsoft Corporation.

Each of directory service 108, online search service 110, online news service 112, productivity software service(s) 114, content curation service 116, social networking service 118, content/document management service 120 and file hosting service 122 may be implemented using one or more server computers. An example of a processor-based computer system that may be used to implement a server computer will be described below in reference to FIG. 10, although various other implementations are possible. It is noted that other services, including other enterprise-related services, may also be accessed by user devices $102_1$-$102_N$ beyond those shown in FIG. 1 and described herein.

As further shown in FIG. 1, each of user device $102_1$-$102_N$ includes a web browser installed thereon. For example, user device $102_1$ includes a web browser 130 installed thereon. As would be readily understood by persons skilled in the relevant art(s), web browser 130 comprises a software application that enables a user of user device $102_1$ to search for, retrieve, and traverse information resources on one or more of enterprise network 104 and public network 106. Each information resource may be identified by a URL and may be a web page, an image, a video, or other piece of content. Hyperlinks present in information resources may enable a user to easily navigate web browser 130 to related information resources.

Each web browser installed on user devices $102_1$-$102_N$ comprises new tab page (NTP) generation logic. For example, user device $102_1$ comprises new tab page generation logic 132. As will be described below, new tab page generation logic 132 is configured to automatically generate a new tab page for presentation to a user of user device $102_1$ via a GUI of web browser 130, wherein the new tab page includes features that facilitate access by the user to enterprise-related content. The enterprise-related content may include, for example and without limitation, enterprise-related web sites, content shared by colleagues, content trending among team members, documents that the user recently worked on, enterprise-related news, and industry-related news.

In FIG. 1, each of directory service 108, productivity software service(s) 114, content curation service 116, social networking service 118, content/document management service 120 and file hosting service 122 is shown as being connected to public network 106. However, it is possible that one, more than one, or all of these services could instead be connected to enterprise network 104 (i.e., the service(s) could be hosted on-site with respect to an enterprise). For example, rather than representing AZURE™ ACTIVE DIRECTORY®, a cloud-based service that is accessed via the Internet, directory service 108 may represent a version of Microsoft's ACTIVE DIRECTORY™ that is suitable for being hosted locally by an enterprise. Similarly, each of productivity software service(s), content curation service 116, social network service 118, content/document management service 120 and file hosting service 122 may represent services that are hosted locally by an enterprise and thus are connected to enterprise network 104 rather than public network 106. The techniques described herein for enabling web browser 130 to generate and display a new tab page or similar interface that includes features that facilitate access by a user to enterprise-related content are equally applicable to such alternate embodiments.

Figure 2:
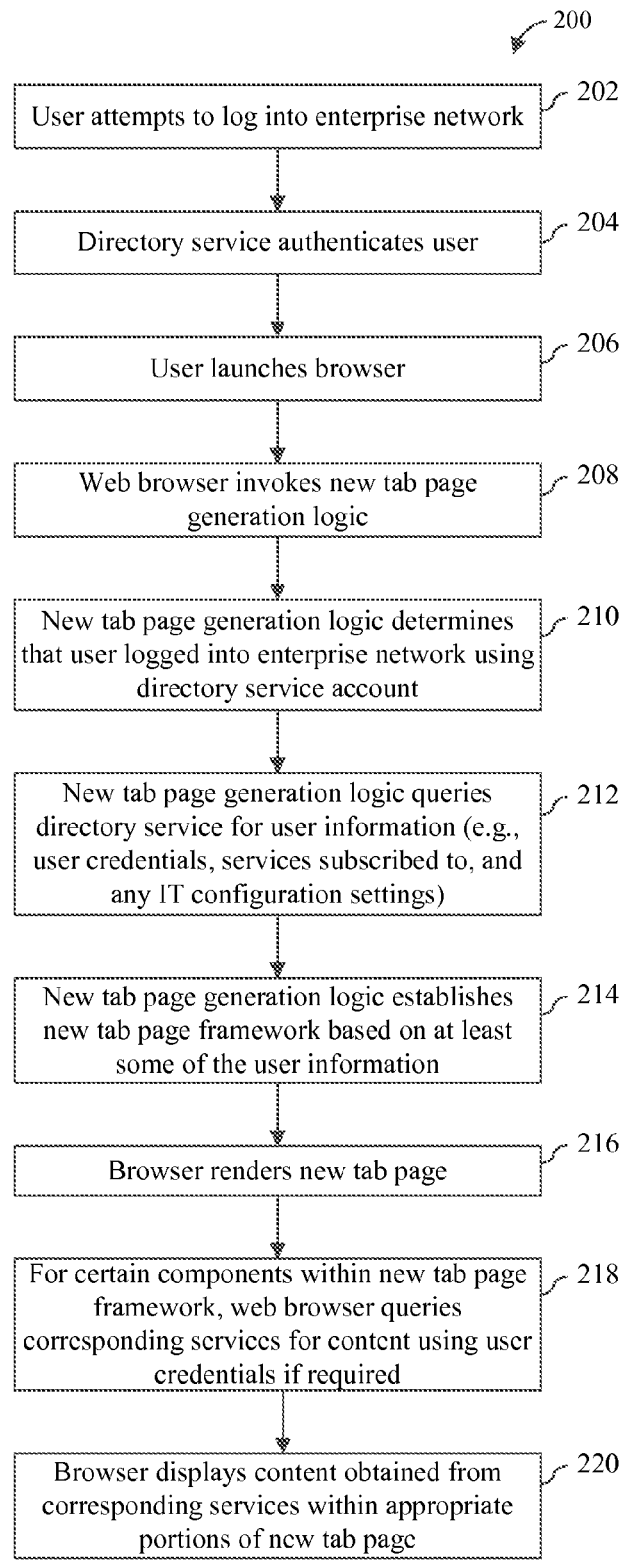
FIG. 2 depicts a flowchart of a method for enabling a web browser to provide a user with access to enterprise-related content via a new tab page in accordance with an embodiment.

One manner by which system 100 operates to enable web browser 130 to generate and display such a new tab page will now be described in reference to FIG. 2. In particular, FIG. 2 depicts a flowchart 200 of a method for enabling web browser 130 to provide a user with access to enterprise-related content via a new tab page. The method of flowchart 200 will be described with continued reference to components of system 100 for the sake of illustration only. Persons skilled in the relevant art(s) will appreciate that the method of flowchart 200 may be carried out by other components or systems entirely.

As shown in FIG. 2, the method of flowchart 200 begins at step 202, in which a user attempts to log into enterprise network 104. This step may involve, for example, the user submitting certain login information (e.g., a user ID and/or password) via a suitable user interface of user device $102_1$. Step 202 may encompass various other methods by which a user may attempt to log into enterprise network 104 using user device $102_1$. The user's login information is transmitted to directory service 108.

At step 204, directory service 108 receives the user's login information and processes such information to determine whether or not the user should be authenticated. In this example process flow, directory service 108 authenticates the user, and as a result, the user is permitted to access certain resources and/or services of enterprise network 104.

In one embodiment, step 204 comprises directory service 108 transmitting one or more credentials to user device $102_1$ that may be used by user device $102_1$ to access such resources or services.

At step 206, the user of user device $102_1$ causes web browser 130 to be launched thereon. Step 206 may comprise, for example and without limitation, the user launching web browser 130 by interacting with a web browser icon displayed on a launch screen or other GUI of an operating system that is executing upon user device $102_1$, by interacting with a file that is registered to be opened using web browser 130, or via some other means for launching web browser 130.

At step 208, web browser 130 invokes new tab page generation logic 132. This step may occur more or less immediately after the user launches web browser 130 in an embodiment in which web browser 130 is configured to present the user with a new tab page at application launch. This step may also occur when the user taps, clicks on or otherwise interacts with a graphical representation of a new tab in a GUI of web browser 130.

At step 210, new tab page generation logic 132 determines whether or not the user logged into enterprise network 130 using an account recognized by directory service 108. In this example process flow, new tab page generation logic 132 determines that the user has logged into enterprise network 130 using an account recognized by directory service 108. New tab generation logic 132 may determine this by communicating with an operating system or other software component executing on user device $102_1$ that has access to this information. Alternatively, new tab generation logic 132 may determine this by communicating directly with directory service 108.

At step 212, in response to determining that the user is associated with an enterprise account recognized by directory service 108, new tab page generation logic 132 queries directory service 108 for information about the user and directory service 108 returns such information. The information may include, for example and without limitation, one or more user credentials, a list of services that the user is subscribed to or is otherwise entitled to access, one or more configuration settings (e.g., one or more IT configuration settings), or other information associated with the user's enterprise account or with the enterprise itself At step 214, new tab page generation logic 132 establishes a framework for a new tab page based on at least some of the information obtained from directory service 108 during step 212. In an embodiment, the new tab page framework comprises a framework that is provided to and processed by a rendering engine within web browser 130 to create the display of a new tab page within the GUI of web browser 130.

In one embodiment, the new tab page framework is included within the information provided by directory service 108 during step 212. In an alternate embodiment, new tab page generation logic 132 dynamically constructs the new tab page framework based at least in part on some of the information received from directory service 108 during step 212. For example, the new tab page framework may be dynamically generated based on information such as which services the user has access to, which enterprise account the user is signed into, which enterprise the user belongs to, and/or what custom configurations the enterprise's IT department has specified.

By way of further example, the new tab page framework may be configured to organize content using a layout that groups content into logical categories, which may be referred to as channels. The channels may correspond, for example, to discrete services (e.g., social networking service 118, external web sites, etc.) and/or topics (e.g., machine learning, patent law, etc.). The channel(s) that are displayed on the new tab page for a particular enterprise user may depend on the services the user has access to, which enterprise account the user is signed into, which enterprise the user belongs to, and/or what customization the IT department has performed. As was previously noted, such information may be obtained from directory service 108.

As an example, the new tab page framework may optionally include a component or channel that displays representations of and corresponding links to enterprise documents that are trending around the user. Such content may be displayed under a heading "Documents trending around you." However, new tab page generation logic 132 may only include such a component in the new tab page framework if it determines that the user is subscribed to or is otherwise able to access content curation service 116.

As another example, the new tab page framework may optionally include a component or channel that displays representations of and corresponding links to enterprise documents that a user has recently worked on. Such content may be displayed under a heading "Recent Office Documents." However, new tab page generation logic 132 may only include such a component in the new tab page framework if it determines that the user is subscribed to or is otherwise able to access productivity software service(s) 114.

As noted above, the information received from directory service 108 in step 212 may include configuration settings managed by an IT administrator or other authorized entity (e.g., via admin device 124). These settings may include, for example, information to be included in a corporate channel feed that is to be included within the new tab page framework. This information may also include, for example, particular web sites that should be included within a "top sites" portion or other portion of the new tab page framework. For example, internal web sites may be specified that are useful to enterprise employees seeking corporate information (e.g., (e.g. a human resources web site). As another example, web sites may be specified that provide utilities or other features that are useful to the enterprise user in performing his/her job.

The IT configuration information may further include branding information (e.g. a corporate logo or the like) to be included on the new tab page, copyright, confidentiality, or other legal information to be included on the new tab page, as well as various other types of information that an enterprise might want to include on the enterprise version of the new tab age.

In an embodiment, the new tab page framework may be adapted over time. This may be achieved, for example, by modifying a version of the new tab page maintained by directory service 108 or by modifying new tab page generation logic 132 (e.g., by updating web browser 130 software). For example, new channels may be added or removed from the new tab page framework over time. Modifications to the new tab page framework may be made automatically based on user actions in certain embodiments. For example, a user's interactions with the new tab page may be monitored and/or collected and used as signals upon which future modifications to the new tab page framework may be based. Such modifications may include modifying the type of content that is shown within channels, sorting the content that is shown within channels, modifying which channels are shown to the user, and/or sorting the order in which channels are shown to the user. Such modifications to the new tab page framework may help improve the user's ability to access relevant content directly from the new tab page.

In a particular embodiment, the new tab page generated by new tab page generation logic 132 includes elements that a user can interact with to provide explicit feedback regarding various channels included within the new tab page framework. For example, the user may be allowed to specify whether or not they are interested in a particular channel. If the user indicates that they are not interested in a particular channel, then the new tab page framework may be modified for that user to remove the particular channel therefrom. As another example, the user may be allowed to specify an order in which channels should appear within the new tab page, or otherwise modify the arrangement of channels within the new tab page.

In addition to feedback that can be collected via explicit user gestures such as those described above, modifications to the new tab page framework may also be based on implicit user gestures or behaviors. For example, new tab page generation logic 132 or some other component internal to web browser 130 or external thereto (e.g., directory service 108 or online search service 110) may track which channels a user interacts with (e.g., clicks on) most often, which items within particular channels a user interacts with most often, and so forth, and then modify the new tab page framework accordingly.

It is noted that, in certain embodiments, the aforementioned features relating to the dynamic generation of the new tab page framework that are carried out by new tab page generation logic 132 may instead be carried out by a trusted service such as directory service 108 or some other service or entity external to user device 102₁ (e.g., online search service 110). In accordance with one such alternate embodiment, the new tab page framework may be provided to new tab page generation logic 132 by directory service 108 during step 212.

Returning now to the description of flowchart 200, after new tab page generation logic 132 establishes the new tab page framework during step 214, web browser 130 renders the new tab page to a GUI thereof based on the new tab page framework.

As part of this rendering process, for certain components within the new tab page framework, web browser 130 queries a corresponding service (e.g., one of online search service 110, online news service 112, productivity software service(s) 114, content curation service 116, social networking service 118, content/document management service 120, and file hosting service 122) to obtain content for inclusion within the component as shown in step 218. By way of example, web browser 130 may query online search service 110 or online news service 112 for content to be included within a channel of the new tab page framework that is intended to provide access to enterprise-related or industry-related news.

Querying a service in step 218 may comprise utilizing certain user credentials that were provided during step 212 to access the service. By way of example only, in step 218, web browser 130 may utilize user credentials that were provided during step 212 to access content curation service 116 for the purpose of obtaining content to be included within a channel that displays representations of and corresponding links to enterprise documents that are trending around the user. As another example, in step 218, web browser 130 may utilize user credentials that were provided during step 212 to access productivity software service(s) 114 for the purpose of obtaining content to be included in a channel that displays representations of and corresponding links to enterprise documents that a user has recently worked on.

As part of the rendering process, web browser 130 further displays the content that was obtained from the corresponding services during step 218 within the appropriate portions of the new tab page, as shown at step 220. A content relevancy ranking algorithm may be implemented to ensure that the most relevant content will be displayed within the appropriate portions.

To help further illustrate some of the concepts that were introduced in the foregoing description of system 100 and flowchart 200, an example enterprise version of a new tab page that may be generated and displayed by web browser 130 in response to determining that a user is associated with an enterprise account will now be described in reference to FIGS. 3 and 4. In particular, FIG. 3 illustrates a web browser GUI 300 within which is displayed a first portion of an example new tab page via which a user can access enterprise-related content, while FIG. 4 illustrates the same web browser GUI 300 within which a second portion of the same new tab page is displayed.

Figure 3:
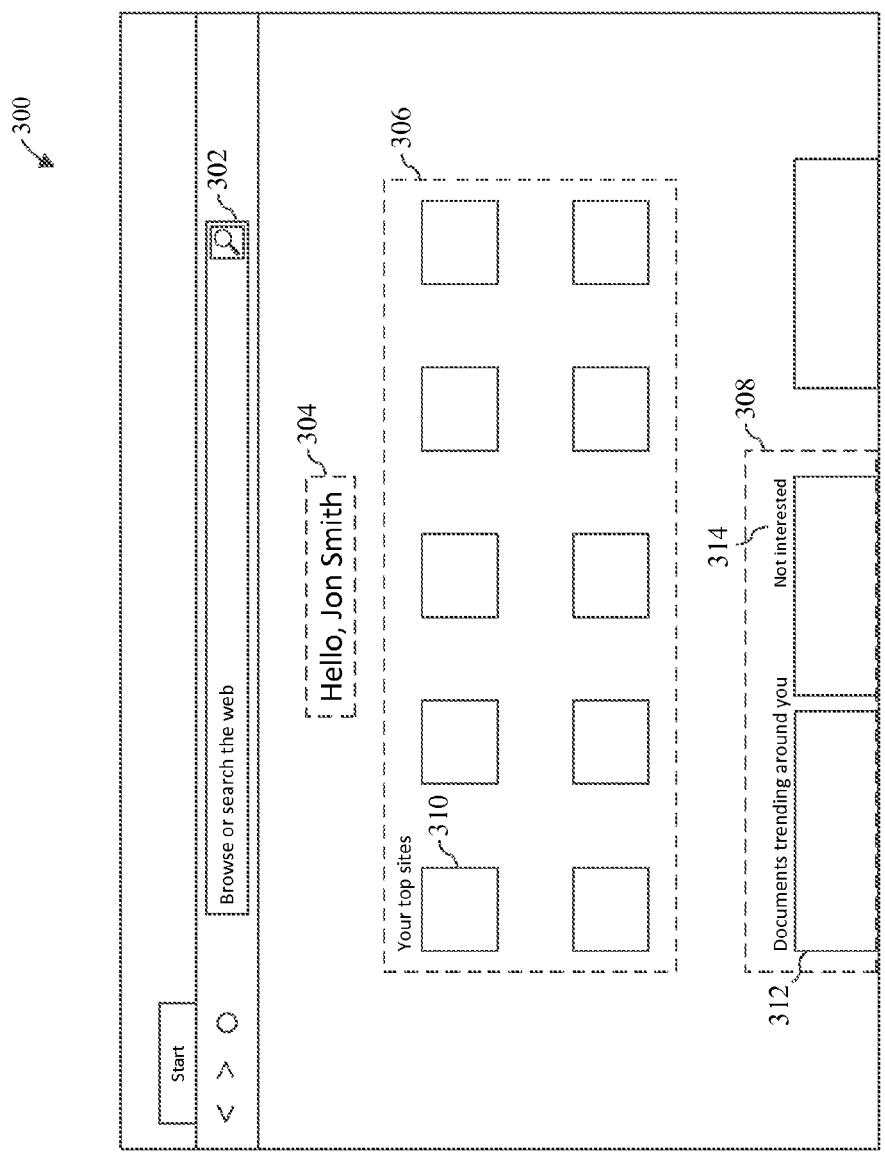
FIG. 3 illustrates a first portion of an example new tab page via which a user can access enterprise-related content in accordance with an embodiment.
Figure 4:
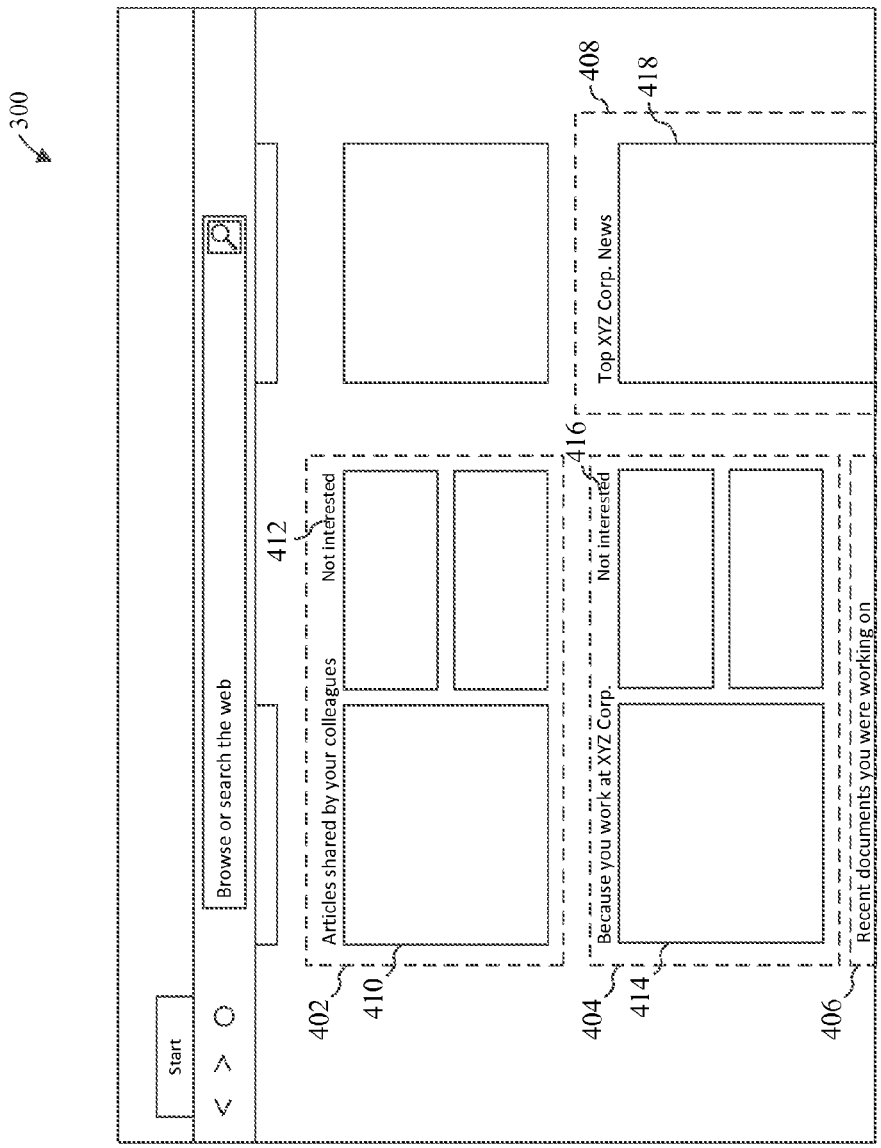
FIG. 4 illustrates a second portion of an example new tab page via which a user can access enterprise-related content in accordance with an embodiment.

As shown in FIG. 3, web browser GUI 300 includes a search box 302. A user can type or otherwise input search queries into search box 302 and then submit them to locate desired information resources. Such queries may be submitted, for example, to online search service 110 to locate desired information resources on public network 106. Information resources located on enterprise network 104 may also be targeted by searches in certain implementations. In an embodiment that will be described below, a drop-down menu associated with search box 302 may be utilized by web browser 130 to present recommended information resources to the user.

As further shown in FIG. 3, the first portion of the new tab page includes a personalized greeting 304 that includes the user's name ("Jon Smith"). The user's name may be obtained by new tab generation logic 132, for example, as part of the information received from directory service 108 during step 212 of the method of flowchart 200. Inclusion of the user's name in the new tab page may serve to give the page a personalized feeling and let the user know the page has been customized for his/her viewing and use.

The first portion of the new tab page further includes a "your top sites" section 306 that includes textual and/or graphical representations of web sites that may be of interest to the user as well as a means by which the user can access such web sites (e.g., interactive links). In FIG. 3, one such web site representation is marked with reference numeral 310. In accordance with an embodiment, by clicking on, tapping, or otherwise interacting with web site representation 310, the user may cause web browser 130 to retrieve and display the information resource represented thereby.

The web sites represented in section 306 may be identified based on prior access by the user. For example, the web sites represented in section 306 may include web sites that have been frequently visited and/or recently visited by the user.

Additionally or alternatively, the web sites represented in section 306 may be identified based on IT configuration information obtained from directory server 108 during step 212 of the method of flowchart 200. In this manner, the IT department within an enterprise can identify particular web sites that should be included within section 306. As noted above, the IT department can specify web sites that may be useful to enterprise employees seeking corporate information and/or that provide utilities or other features that are useful to the enterprise user in performing his/her job.

The first portion of the new tab page further includes a "documents trending around you" section 308 that includes textual and/or graphical representations of documents that are determined to be trending around the user as well as a means by which the user can access such documents (e.g., interactive links). In FIG. 3, one such document representation is marked with reference numeral 312. In accordance with an embodiment, by clicking on, tapping, or otherwise interacting with document representation 312, the user may cause web browser 130 to retrieve the document represented thereby and open it using an appropriate application (e.g., a text document may be opened within a word processing program while a spreadsheet may be opened within a spreadsheet program). Web browser 130 may also present a preview version of the document directly within web browser GUI 300.

In an embodiment, the identity of the documents represented within section 308 is obtained by web browser 130 from content curation service 116 during step 218 of the method of flowchart 200. Web browser 130 may utilize user credentials obtained during step 212 of the method of flowchart 200 to obtain such information from content curation service 116. By so doing, the enterprise version of the new tab page shown in FIG. 3 can leverage the features of content curation service 116 to provide the user with easy access to documents trending around him/her. This can make it easy for the user to find project documents, as trending documents will be displayed each time the user opens a new tab page. This feature can also facilitate serendipitous discovery by the user of relevant enterprise-related content and help increase the user's general situational awareness.

As further shown in FIG. 3, section 308 includes an element 314 that is represented by the words "not interested." In accordance with an embodiment, a user can click on, tap or otherwise interact with element 314 to indicate that the user no longer wishes to see the content included in section 308 within his/her new tab pages. In response to receiving such information, new tab page generation logic 132 may immediately remove section 308 from the current new tab page and/or remove section 308 from all subsequent versions of the new tab page that it renders for this particular enterprise user. In an alternate embodiment, section 308 may include an element that a user can interact with to selectively toggle on and off section 308 during a browsing session, so that after causing section 308 to be hidden, the user can bring it back. As was previously noted, the selective display of section 308 (or any other section or channel) may also be premised on other explicit or implicit user gestures or behaviors. For example, section 308 may be hidden or shown based on usage. The foregoing comments with respect to whether or not section 308 is shown or hidden are equally applicable to the other sections described herein with respect to web browser GUI 300.

The second portion of the new page, which is illustrated in FIG. 4, may be made visible to the user after the user scrolls down from the first portion of the new tab page shown in FIG. 3. As shown in FIG. 4, the second portion of the new tab page includes an "articles shared by your colleagues" section 402 that includes textual and/or graphical representations of articles that have been shared by colleagues of the user or shared within groups to which the user belongs as well as a means by which the user can access such articles (e.g., interactive links). In FIG. 4, one such article representation is marked with reference numeral 410. In accordance with an embodiment, by clicking on, tapping, or otherwise interacting with article representation 410, the user may cause web browser 130 to retrieve and display the article represented thereby.

In an embodiment, the identity of the articles represented within section 402 is obtained by web browser 130 from one or more of content curation service 116, social networking service 116, or content/document management service 120 during step 218 of the method of flowchart 200. Web browser 130 may utilize user credentials obtained during step 212 of the method of flowchart 200 to obtain such information from these services. By so doing, the enterprise version of the new tab page shown in FIG. 4 can leverage the features of these services to provide the user with easy access to articles (or other content such as web sites) being shared by his/her colleagues or being shared within groups to which the user belongs.

As further shown in FIG. 4, in a like manner to section 308 discussed above in reference to FIG. 3, section 402 includes an element 412 that a user can click on, tap or otherwise interact with to indicate that the user no longer wishes to see the content included in section 402 within his/her new tab pages.

The second portion of the new tab page further includes a "because you work at XYZ Corp." section 404 that includes textual and/or graphical representations of news items or other content that relate to the industry in which the user's enterprise is operating. In FIG. 4, one such news item representation is marked with reference numeral 414. In accordance with an embodiment, by clicking on, tapping, or otherwise interacting with news item representation 414, the user may cause web browser 130 to retrieve and display the news item represented thereby.

In an embodiment, the identity of the news items represented within section 404 is obtained by web browser 130 from one or more of online search service 110 and online news service 112 during step 218 of the method of flowchart 200. Web browser 130 may obtain information about the user's enterprise (e.g., the name of the enterprise, the name of an industry in which the enterprise operates, keywords relating to the industry in which the enterprise operates, etc.) during step 212 of the method of flowchart 200 and then provide such information to one or more of online search service 110 and online news service 112 so that those services can selectively retrieve and return content of relevance to the industry in which the user's enterprise operates. By so doing, the enterprise version of the new tab page shown in FIG. 4 can leverage the features of these services to provide the user with easy access to news items and other content related to the industry in which the user's enterprise is operating. In this way, the user can easily access current industry news, articles, key events and stock prices specific to his/her industry. The user can also easily keep track of industry trends and his/her competitors.

As further shown in FIG. 4, in a like manner to section 308 discussed above in reference to FIG. 3, section 404 includes an element 416 that a user can click on, tap or otherwise interact with to indicate that the user no longer wishes to see the content included in section 404 within his/her new tab pages.

The second portion of the new tab page also includes a "top XYZ Corp. news" section 408 that includes textual and/or graphical representations of news items or other content that relate to the user's enterprise. In FIG. 4, one such news item representation is marked with reference numeral 418. In accordance with an embodiment, by clicking on, tapping, or otherwise interacting with news item representation 418, the user may cause web browser 130 to retrieve and display the news item represented thereby.

In an embodiment, the identity of the news items represented within section 408 is obtained by web browser 130 from one or more of online search service 110 and online news service 112 during step 218 of the method of flowchart 200. Web browser 130 may obtain information about the user's enterprise (e.g., the name of the enterprise) during step 212 of the method of flowchart 200 and then provide such information to one or more of online search service 110 and online news service 112 so that those services can selectively retrieve and return content of relevance to the user's enterprise. By so doing, the enterprise version of the new tab page shown in FIG. 4 can leverage the features of these services to provide the user with easy access to news items and other content related to the user's enterprise. In this way, the user can easily access current enterprise-related news, articles, key events and stock prices specific to his/her enterprise.

The inclusion of sections 404 and 406 in the new tab page may be deemed desirable to an enterprise because such sections may help encourage users who are inclined to browse the Internet during business hours to spend their time browsing content that is relevant to the enterprise as opposed to spending their time browsing non-work-related content. This method of encouraging useful browsing may be deemed more desirable than restricting access by enterprise users to a set of internal web sites only and/or to a limited set of external web sites, as such users may not appreciate having their browsing freedom curtailed in this manner.

The second portion of the new tab page further includes a "recent documents you were working on" section 406 that includes textual and/or graphical representations of documents that the user has worked on or otherwise accessed recently as well as a means by which the user can access such documents (e.g., interactive links). In FIG. 4, one such document representation is marked with reference numeral 414. In accordance with an embodiment, by clicking on, tapping, or otherwise interacting with document representation 414, the user may cause web browser 130 to retrieve the document represented thereby and open it using an appropriate application (e.g., a text document may be opened within a word processing program while a spreadsheet may be opened within a spreadsheet program). Web browser 130 may also present a preview version of the document directly within web browser GUI 300.

In an embodiment, the identity of the documents represented within section 406 is obtained by web browser 130 from one or more of productivity software service(s) 114, content curation service 116, content/document management service 120 and file hosting service 122 during step 218 of the method of flowchart 200. Web browser 130 may utilize user credentials obtained during step 212 of the method of flowchart 200 to obtain such information from these services. By so doing, the enterprise version of the new tab page shown in FIG. 4 can leverage the features of these services to provide the user with easy access to documents he/she was recently working on. This can make it easy for the user to pick up and complete pervious tasks.

The foregoing description of FIGS. 3 and 4 referred to various exemplary sections or channels that may be displayed on an enterprise version of a new tab page in accordance with embodiments. However, these section were described herein by way of example only and are not intended to be limiting. Persons skilled in the relevant art(s), based on the teachings provided herein, will appreciate that different or additional sections or channels may be included in the enterprise version of the new tab page.

In the foregoing description, it was mentioned that an IT department could customize the enterprise version of the new tab page by providing IT configuration settings to directory service 108. These IT configuration settings could then be used to drive dynamic generation of the new tab page framework. In an alternate embodiment, the IT department could also provide channel content to the enterprise version of the new tab page via a well-defined Rich Site Summary (RSS) feed mechanism. In particular, using a suitable computing device (e.g., admin device 124), an IT administrator or other authorized entity could register an RSS feed with Web browser 130, which then renders such content as a channel when the new tab page is displayed.

Figure 5:
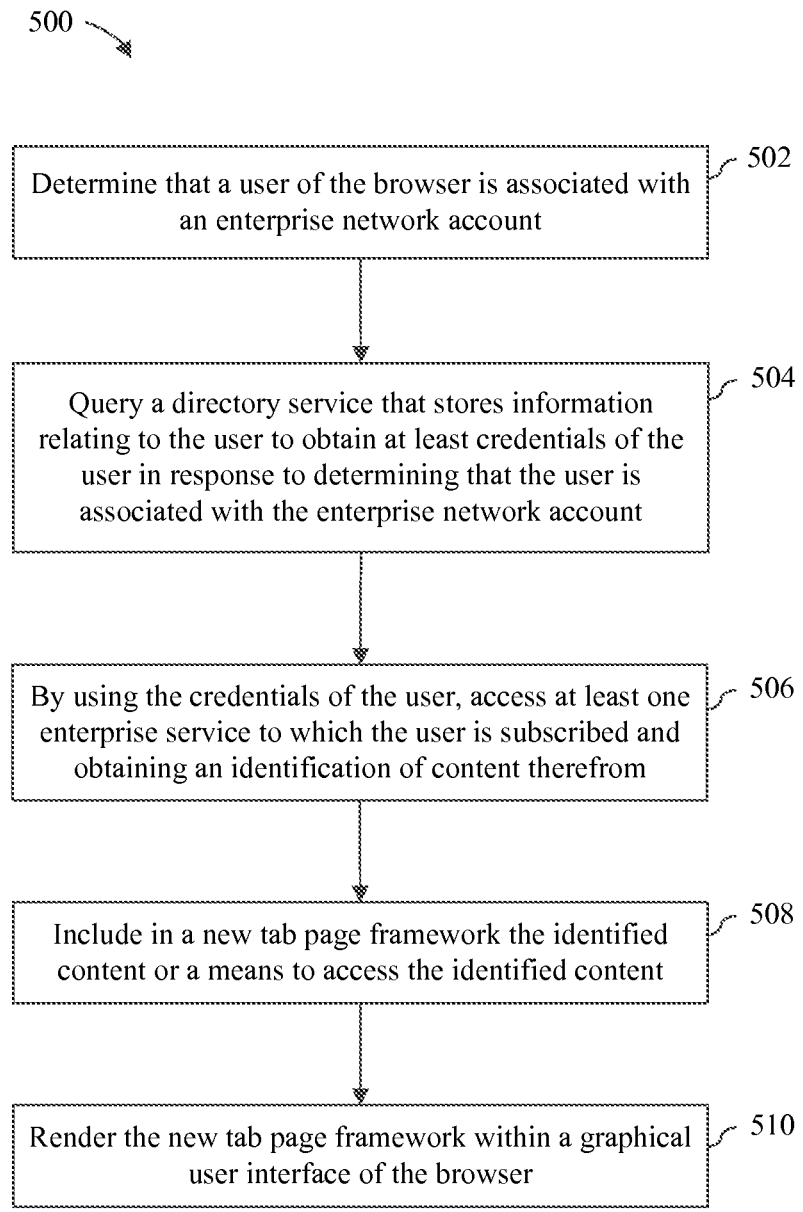
FIG. 5 depicts a flowchart of a method performed by a web browser for generating and presenting to a user a new tab page that enables the user to access enterprise-related content in accordance with an embodiment.

To further illustrate the foregoing concepts, FIG. 5 depicts a flowchart 500 of a method performed by a web browser (e.g., web browser 130 of FIG. 1) for generating and presenting to a user a new tab page that enables the user to access enterprise-related content. The method of flowchart 500 will be described with continued reference to components of system 100 for the sake of illustration only. Persons skilled in the relevant art(s) will appreciate that the method of flowchart 500 may be carried out by other components or systems entirely.

As shown in FIG. 5, the method of flowchart begins at step 502 in which web browser 130 determines that a user thereof is associated with an enterprise network account. This step may entail determining that the user has logged into an account recognized by directory service 108.

At step 504, in response to determining that the user is associated with the enterprise network account, web browser 130 queries directory service 108 that stores information relating to the user to obtain at least credentials of the user.

At step 506, by using the credentials of the user obtained during step 504, web browser 130 accesses at least one enterprise service to which the user is subscribed and obtains an identification of content therefrom. The at least one enterprise service may comprise one or more of productivity software service(s) 114, content curation service 116, social networking service 118, content/document management service 120, and file hosting service 122.

For example, in accordance with step 506, web browser 130 may access content curation service 116 and obtain therefrom an identification of documents that are trending around a user. As another example, in accordance with step 506, web browser 130 may access productivity software service(s) 114 and obtain therefrom an identification of documents that the user has worked on, such as but not limited to documents that the user has recently worked on. As yet another example, in accordance with step 506, web browser 130 may access social networking service 118 and obtain therefrom an identification of content that has been shared by persons to whom the user is connected via social networking service 118.

At step 508, web browser 130 includes in a new tab page framework the identified content or a means for accessing the identified content (e.g., interactive links or the like). The new tab page framework referred to in step 508 may be dynamically generated based on at least a portion of the information relating to the user that was referred to in step 504. The new tab page framework may be retrieved by web browser 130 from a trusted service such as directory service 108 or some other service or entity external to user device $102_1$ (e.g., online search service 110). Web browser 130 (or some other entity such as directory service 108) may dynamically generate the new tab page framework based on at least a portion of the information relating to the user that was referred to in step 504. For example, the information relating to the user may include an identification of one or more enterprise services to which the user is subscribed and web browser 130 may add one or more channels of information to the new tab page framework based on the one or more enterprise services to which the user is subscribed. As another example, the new tab page framework may be modified based on the enterprise account which the user has logged into or the enterprise to which the user belongs. Web browser 130 may obtain the portion of the information relating to the user by querying directory service 108 (e.g., as part of the querying in step 504).

In one embodiment of the method of flowchart 500, web browser 130 also includes in the new tab page framework one or more elements that a user may interact with to cause one or more channels of information to be removed therefrom. In another embodiment, web browser 130 may also include an RSS feed within the new tab page framework, the RSS feed providing access to content related to the enterprise.

At step 510, web browser 130 renders the new tab page framework within a GUI thereof.

In one embodiment of the method of flowchart 500, step 504 further includes querying directory service 108 to obtain an identification of an enterprise with which the user is associated. In accordance with such an embodiment, web browser 130 may obtain an identification of content that relates to the enterprise from online search service 110 or online news service 112 and then include in the new tab page framework the content that relates to the enterprise or a means for accessing the content that relates to the enterprise (e.g., interactive links or the like).

In another embodiment of the method of flowchart 500, step 504 further includes querying directory service 108 to obtain information indicative of an industry in which the user is employed. In accordance with such an embodiment, web browser 130 may obtain an identification of content that relates to the industry from online search service 110 or online news service 112 and then include in the new tab page framework the content that relates to the industry or a means for accessing the content that relates to the industry (e.g., interactive links or the like).

In yet another embodiment of the method of flowchart 500, step 504 further includes querying directory service 108 to obtain an identification of one or more web sites (e.g., one or more web sites selected by an enterprise IT department). In accordance with such an embodiment, web browser 130 may include in the new tab page framework a means for accessing each of the one or more web sites (e.g., interactive links or the like).

Figure 6:
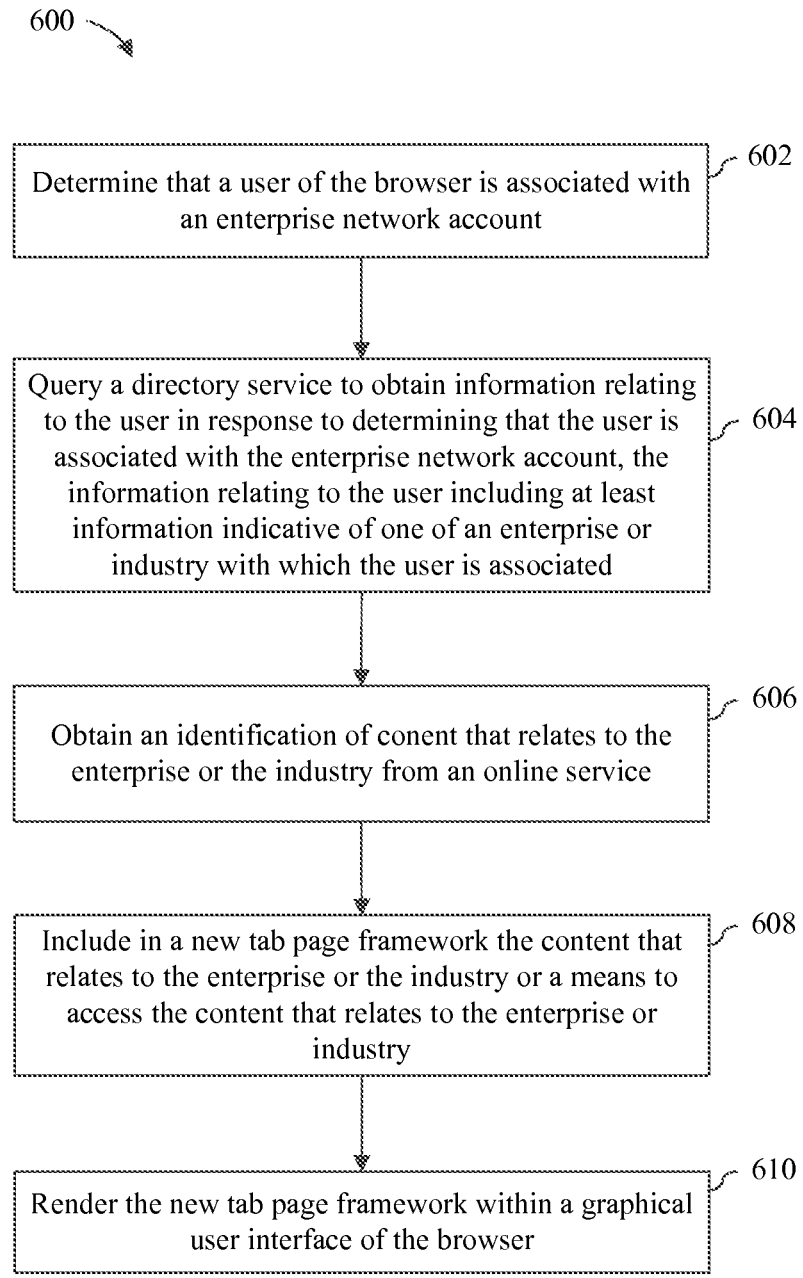
FIG. 6 depicts a flowchart of another method performed by a web browser for generating and presenting to a user a new tab page that enables the user to access enterprise-related content in accordance with an embodiment.

FIG. 6 depicts a flowchart 600 of another method performed by a web browser (e.g., web browser 130 of FIG. 1) for generating and presenting to a user a new tab page that enables the user to access enterprise-related content in accordance with an embodiment. The method of flowchart 600 will be described with continued reference to components of system 100 for the sake of illustration only. Persons skilled in the relevant art(s) will appreciate that the method of flowchart 600 may be carried out by other components or systems entirely.

As shown in FIG. 6, the method of flowchart begins at step 602 in which web browser 130 determines that a user thereof is associated with an enterprise network account. This step may entail determining that the user has logged into an account recognized by directory service 108.

At step 604, in response to determining that the user is associated with the enterprise network account, web browser 130 queries directory service 108 to obtain information relating to the user, wherein such information at least includes at least information indicative of one of an enterprise or industry with which the user is associated.

At step 606, web browser 130 obtains an identification of content that relates to the enterprise or the industry from an online service, such as online search service 110 or online news service 112.

At step 608, web browser 130 includes in a new tab page framework the content that relates to the enterprise or the industry or a means for accessing the content that relates to the enterprise or industry (e.g., interactive links or the like).

At step 610, web browser 130 renders the new tab page framework within a GUI thereof.

Figure 7:
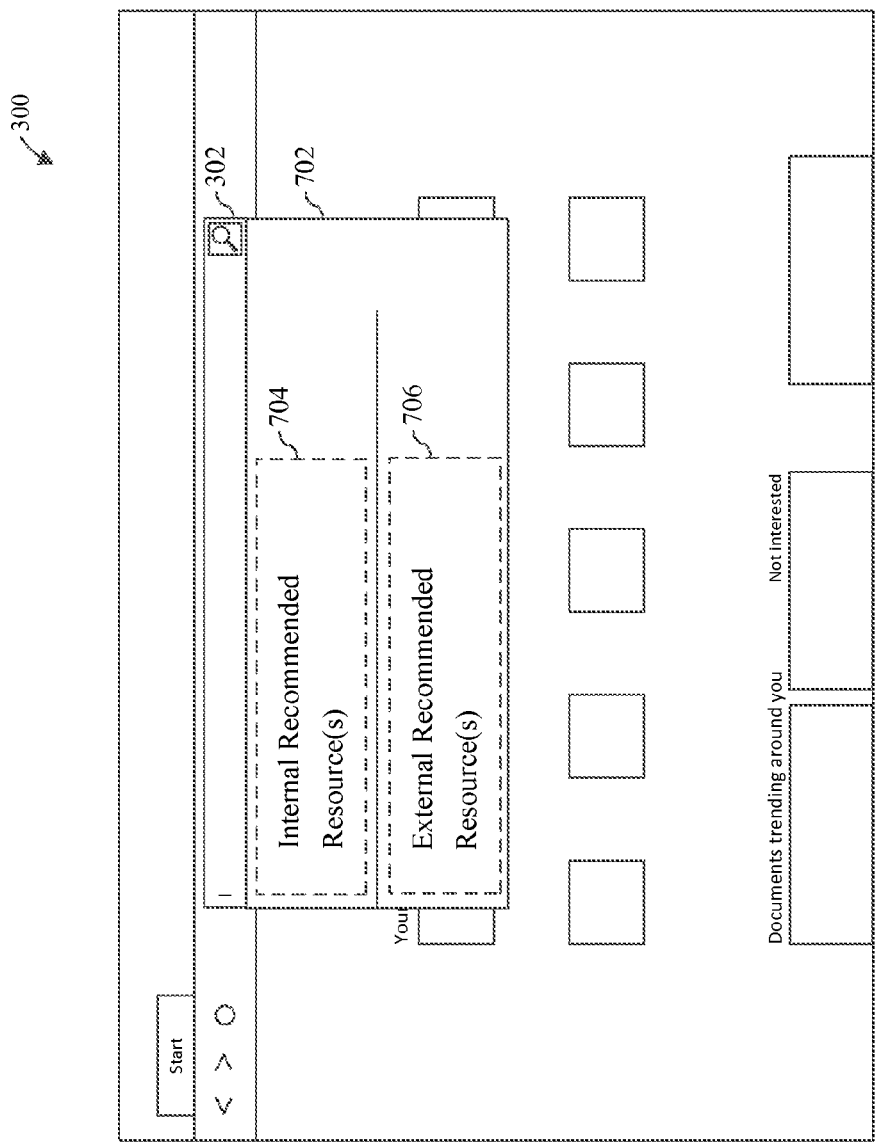
FIG. 7 illustrates an example new tab page in which information resources may be recommended within a search box drop down menu, the information resources including information resources that are accessible internally with respect to an enterprise network and information resources that are accessible externally with respect to the enterprise network.

In a further embodiment of system 100, web browser 130 may be configured to present recommended information resources to an enterprise user via the new tab page, such as via a drop-down menu of a search box of the new tab page. Such an embodiment is illustrated in FIG. 7. In particular, FIG. 7 provides another view of web browser GUI 300 of web browser 130 in which it can be seen that a drop-down menu 702 has appeared below search box 302. Web browser 130 may cause drop-down menu 702 to be displayed, for example, when it determines that a user is interacting with (e.g., clicking on, tapping, entering text into, etc.) search box 302. Web browser 130 may cause a representation of certain recommended information resources to be displayed within drop-down menu 702. Such representations may comprise for example, URLs or other identifiers of content that a user may wish to access. Such representations may also comprise links that a user may interact with to access the recommended content.

In an embodiment, web browser 130 is configured to determine whether a user of web browser 130 is currently logged into an enterprise network (e.g. enterprise network 104). Techniques for performing this operation were previously described. If web browser 130 determines that the user is not logged into an enterprise network, then web browser 130 will cause only information resources that are available on a public network (e.g., the Internet) to be represented within drop-down menu 702. However, if web browser 130 determines that the user is logged into an enterprise network, then web browser 130 will cause information resources that are available on the enterprise network to be represented in drop-down menu 702 either alone or accompanied by representations of recommended information resources available on a public network.

For example, with continued reference to FIG. 7, representations of recommended information resources that are located internally with respect to the enterprise network may be displayed within a first portion 704 of drop-down menu 702 while representations of recommended information resources that are located externally with respect to the enterprise network may be displayed within a second portion 706 of drop-down menu 702. In this way, web browser 130 may provide an enterprise version of the search box drop down menu that takes into account resources of interest on enterprise network 104.

Figure 8:
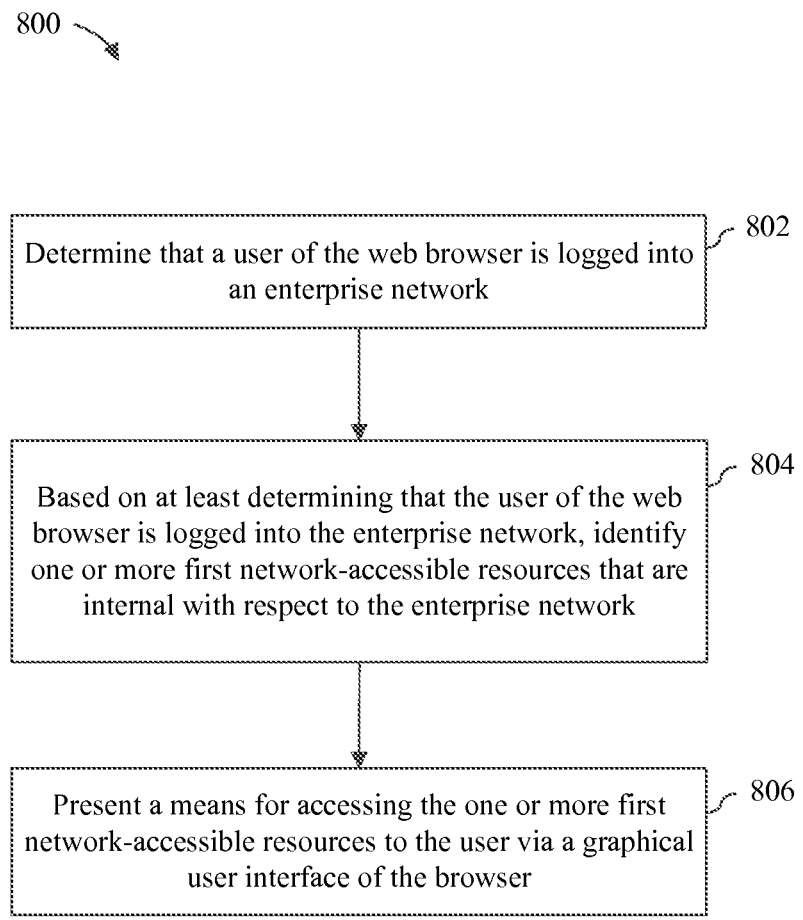
FIG. 8 depicts a flowchart of a method performed by a web browser for recommending information resources to a user, the information resources including at least resources that are accessible internally with respect to an enterprise network.

To help further illustrate this concept, FIG. 8 depicts a flowchart 800 of a method performed by a web browser (e.g., web browser 130) for recommending information resources to a user, the information resources including at least resources that are accessible internally with respect to an enterprise network. The method of flowchart 800 will be described with continued reference to components of system 100 for the sake of illustration only. Persons skilled in the relevant art(s) will appreciate that the method of flowchart 800 may be carried out by other components or systems entirely.

As shown in FIG. 8, the method of flowchart 800 begins at step 802 in which web browser 130 determines that a user thereof is logged into an enterprise network.

At step 804, based on at least determining that the user of web browser 130 is logged into the enterprise network, web browser 130 identifies one or more first network-accessible resources that are internal with respect to the enterprise network.

At step 806, web browser 130 presents a means for accessing the one or more network-accessible resources to the user via the GUI of web browser 130. The means for accessing may comprise an interactive link or the like.

In one embodiment, step 806 comprises presenting the means for accessing the one or more first network-accessible resources to the user via a search box drop-down menu of a new tab page that is displayed within the GUI of web browser 130. In further accordance with such an embodiment, step 806 may comprise presenting the means for accessing the one or more first network-accessible resources to the user via a first portion of the search box drop-down menu and presenting means for accessing one or more second network-accessible resources that are external with respect to the enterprise network via a second portion of the search box drop-down menu.

Although the foregoing embodiments make extensive reference to a new tab page and components thereof (e.g., search box and drop-down menus, etc.), it is to be appreciated that the foregoing techniques may be implemented via other web browser pages or interfaces presented by a web browser.

III. Example Mobile Device Implementation

Figure 9:
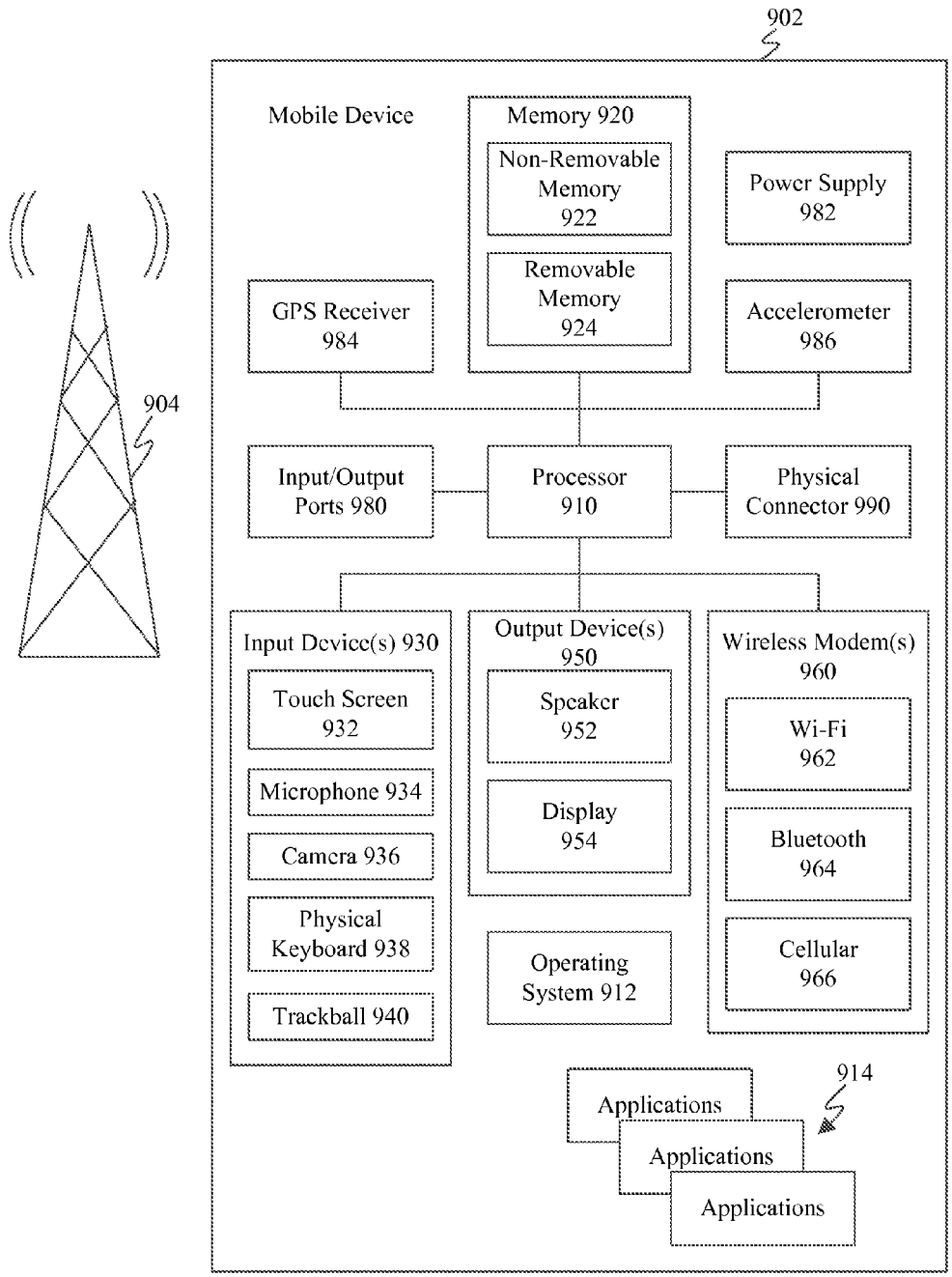
FIG. 9 is a block diagram of an example mobile device that may be used to implement various embodiments.

FIG. 9 is a block diagram of an exemplary mobile device 902 that may implement embodiments described herein. For example, mobile device 902 may be used to implement any of user computing devices $102_1$-$102_N$ of FIG. 1. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smartphone, handheld computer, Personal Digital Assistant (PDA), etc.) and can allow wireless two-way communications with one or more mobile communications networks 904, such as a cellular or satellite network, or with a local area or wide area network.

The illustrated mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

The illustrated mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and applications 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. The input devices 930 can include a Natural User Interface (NUI).

Wireless modem(s) 960 can be coupled to antenna(s) (not shown) and can support two-way communications between the processor 910 and external devices, as is well understood in the art. The modem(s) 960 are shown generically and can include a cellular modem 966 for communicating with the mobile communication network 904 and/or other radio-based modems (e.g., Bluetooth 964 and/or Wi-Fi 962). At least one of the wireless modem(s) 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to perform any of the functions of any of user devices $102_1$-$102_N$, web browser 130, and new tab page generation logic 132 of FIG. 1. Computer program logic for performing the functions of these devices may be stored in memory 920 and executed by processor 910. By executing such computer program logic, processor 910 may be caused to implement any of the features of any of these devices. Also, by executing such computer program logic, processor 910 may be caused to perform any or all of the steps of any or all of the flowcharts depicted in FIG. 2, 5, 6 or 8.

IV. Example Computer System Implementation

Figure 10:
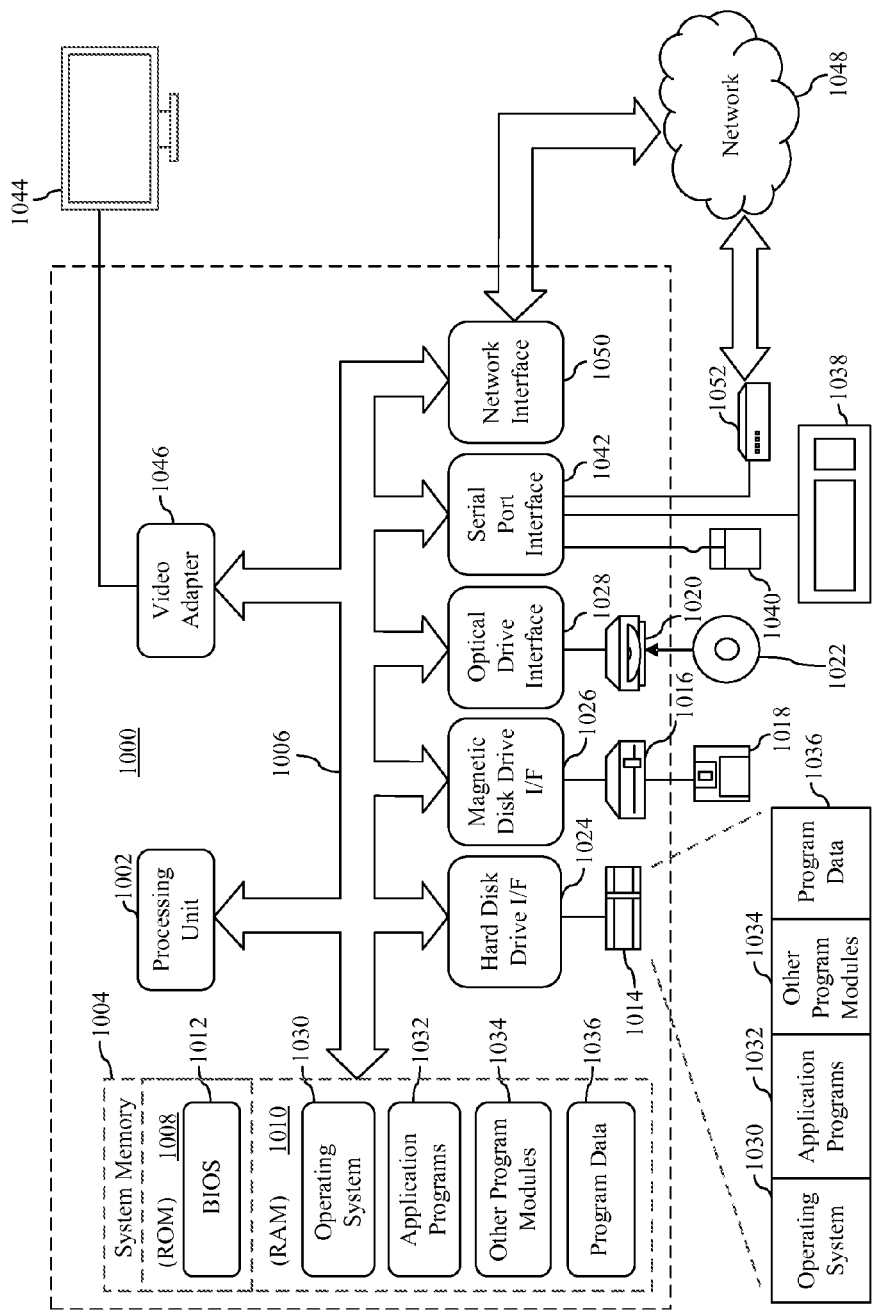
FIG. 10 is a block diagram of an example processor-based computer system that may be used to implement various embodiments.

FIG. 10 depicts an example processor-based computer system 1000 that may be used to implement various embodiments described herein. For example, system 1000 may be used to implement any of user devices $102_1$-$102_N$, web browser 130, new tab page generation logic 132, admin device 124, directory service 108, online search service 110, online news service 112, productivity software service(s)

114, content curation service 116, social networking service 118, content/document management service 120, or file hosting service 122 as described above in reference to FIG. 1. System 1600 may also be used to implement any or all of the steps of any or all of the flowcharts depicted in FIG. 2, 5, 6 or 8. The description of system 1000 provided herein is provided for purposes of illustration, and is not intended to be limiting. Embodiments may be implemented in further types of computer systems, as would be known to persons skilled in the relevant art(s).

As shown in FIG. 10, system 1000 includes a processing unit 1002, a system memory 1004, and a bus 1006 that couples various system components including system memory 1004 to processing unit 1002. Processing unit 1002 may comprise one or more microprocessors or microprocessor cores. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

System 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, BLU-RAY™ disk or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all of the functions and features of user devices $102_1$-$102_N$, web browser 130, new tab page generation logic 132, admin device 124, directory service 108, online search service 110, online news service 112, productivity software service(s) 114, content curation service 116, social networking service 118, content/document management service 120, or file hosting service 122 as described above in reference to FIG. 1. The program modules may also include computer program logic that, when executed by processing unit 1002, performs any of the steps or operations shown or described in reference to the flowcharts of FIGS. 2, 5, 6 and 8.

A user may enter commands and information into system 1000 through input devices such as a keyboard 1038 and a pointing device 1040. Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processing unit 1002 through a serial port interface 1042 that is coupled to bus 1006, but may be connected by other interfaces, such as a parallel port, game port, or a universal serial bus (USB). Such interfaces may be wired or wireless interfaces.

A display 1044 is also connected to bus 1006 via an interface, such as a video adapter 1046. In addition to display 1044, system 1000 may include other peripheral output devices (not shown) such as speakers and printers.

System 1000 is connected to a network 1048 (e.g., a local area network or wide area network such as the Internet) through a network interface or adapter 1050, a modem 1052, or other suitable means for establishing communications over the network. Modem 1052, which may be internal or external, is connected to bus 1006 via serial port interface 1042.

As used herein, the terms "computer program medium," "computer-readable medium," and "computer-readable storage medium" are used to generally refer to memory devices or storage structures such as the hard disk associated with hard disk drive 1014, removable magnetic disk 1018, removable optical disk 1022, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050, serial port interface 1042, or any other interface type. Such computer programs, when executed or loaded by an application, enable system 1000 to implement features of embodiments of the present invention discussed herein. Accordingly, such computer programs represent controllers of the system 1000.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1000 may be implemented as hardware logic/electrical circuitry or firmware. In accordance with further embodiments, one or more of these components may be implemented in a system-onchip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Additional Exemplary Embodiments

An apparatus is described herein. The apparatus includes one or more processors and one or more memory devices connected to the one or more processors. The one or more memory devices store computer program logic that is executable by the one or more processors to perform operations of a web browser. The operations include: determining that a user of the web browser is associated with an enterprise network account; querying a directory service that stores information relating to the user to obtain at least credentials of the user in response to determining that the user is associated with the enterprise network account; by using the credentials of the user, accessing at least one enterprise service to which the user is subscribed and obtaining an identification of content therefrom; including in a new tab page framework the identified content or a means for accessing the identified content, the new tab page framework being dynamically generated based at least one a portion of the information relating to the user; and rendering the new tab page framework within a graphical user interface of the web browser.

In one embodiment of the foregoing apparatus, accessing the at least one enterprise service to which the user is subscribed and obtaining the identification of content therefrom comprises accessing an enterprise content curation service and obtaining therefrom an identification of documents that are trending around the user.

In another embodiment of the foregoing apparatus, accessing the at least one enterprise service to which the user is subscribed and obtaining the identification of content therefrom comprises accessing at least one enterprise productivity software service and obtaining therefrom an identification of documents that the user has worked on.

In yet another embodiment of the foregoing apparatus, accessing the at least one enterprise service to which the user is subscribed and obtaining the identification of content therefrom comprises accessing an enterprise social networking service and obtaining therefrom an identification of content that has been shared by persons to whom the user is connected via the enterprise social networking service.

In still another embodiment of the foregoing apparatus, the operations further include receiving the new tab page framework from the directory service.

In a further embodiment of the foregoing apparatus, querying the directory service further comprise querying the directory service to obtain the at least a portion of the information relating to the user and wherein the operations further include dynamically generating the new tab page framework based on the at least a portion of the information about the user. In further accordance with such an embodiment, dynamically generating the new tab page framework based on the at least the portion of the information relating to the user may comprise one or more of: adding one or more channels of information to the new tab page framework based on one or more enterprise services to which the user is subscribed and adding one or more channels of information to the new tab page framework based on the enterprise account associated with the user.

In a still further embodiment of the foregoing apparatus, the operations further include including in the new tab page framework one or more elements that a user may interact with to cause one or more channels of information to be removed therefrom.

In another embodiment of the foregoing apparatus, querying the directory service further comprises querying the directory service to obtain an identification of an enterprise with which the user is associated and the operations further include: obtaining an identification of content that relates to the enterprise from an online news service or an online search service; and including in the new tab page framework the content that relates to the enterprise or a means for accessing the content that relates to the enterprise.

In yet another embodiment of the foregoing apparatus, querying the directory service further comprises querying the directory service to obtain information indicative of an industry in which the user is employed and the operations further include: obtaining an identification of content that relates to the industry from an online news service or an online search service; and including in the new tab page framework the content that relates to the industry or a means for accessing the content that relates to the industry.

In still another embodiment of the foregoing apparatus, querying the directory service further comprises querying the directory service to obtain an identification of one or more web sites and the operations further include: including in the new tab page framework a means for accessing each of the one or more web sites.

In a further embodiment of the foregoing apparatus, the operations further include: including a Rich Site Summary (RSS) feed within the new tab page framework, the RSS feed providing access to content related to the enterprise.

In a still further embodiment of the foregoing apparatus, at least one of the directory service and the at least one enterprise service comprises a cloud-based service.

In another embodiment of the foregoing apparatus, the at least one enterprise service comprises one or more of: a productivity software service; a content curation service; a social networking service; a content or document management service; and a file hosting service.

A method for generating a new tab page that is performed by a web browser executing on a computing device is also described herein. The method includes: determining that a user of the web browser is associated with an enterprise network account; querying a directory service to obtain information relating to the user in response to determining that the user is associated with the enterprise network account, the information relating to the user including information indicative of at least one of an enterprise or an industry with which the user is associated; obtaining an identification of content that relates to the enterprise or the industry from an online service; including in a new tab page framework the content that relates to the enterprise or the industry or a means for accessing the content that relates to the enterprise or the industry; and rendering the new tab page framework within a graphical user interface of the web browser.

In one embodiment of the foregoing method, obtaining the identification of the content that relates to the enterprise or the industry from the online service comprises obtaining the identification of the content that relates to the enterprise or to the industry from an online news service.

In another embodiment of the foregoing method, obtaining the identification of the content that relates to the enterprise or the industry from the online service comprises obtaining the identification of the content that relates to the enterprise or to the industry from an online search service.

A method is also described herein for providing content recommendations by a web browser executing on a computing device. The method comprises: determining that a user of the web browser is logged into an enterprise network; based at least on determining that the user of the web browser is logged into the enterprise network, identifying one or more first network-accessible resources that are internal with respect to the enterprise network; presenting a means for accessing the one or more first network-accessible resources to the user via a graphical user interface of the web browser.

In one embodiment of the foregoing method, presenting the means for accessing the one or more first network-accessible resources to the user via the graphical user interface of the web browser comprises presenting a means for accessing the one or more first network-accessible resources to the user via a search box drop-down menu of a new tab page that is displayed within the graphical user interface the web browser.

In another embodiment of the foregoing method, presenting the means for accessing the one or more first network-accessible resources to the user via the search box drop-down menu comprises presenting the means for accessing the one or more first network-accessible resources to the user via a first portion of the search box drop-down menu, and the method further comprises presenting means for accessing one or more second network-accessible resources that are external with respect to the enterprise network via a second portion of the search box drop-down menu.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An apparatus, comprising:
one or more processors; and
one or more memory devices connected to the one or more processors, the one or more memory devices storing computer program logic that is executable by the one or more processors to perform operations of a web browser, the operations including:
determining that a user of the web browser is associated with an enterprise network account;
querying a directory service that stores information relating to the user to obtain at least credentials of the user in response to determining that the user is associated with the enterprise network account;
by using the credentials of the user, accessing at least one enterprise service to which the user is subscribed and obtaining an identification of content therefrom;
including in a new tab page framework the identified content or one or more links for accessing the identified content, the new tab page framework being dynamically generated based on at least a portion of the information relating to the user, the new tab page framework organizing the identified content or the one or more links using a layout that groups the identified content or the one or more links into logical categories; and
rendering the new tab page framework within a graphical user interface of the web browser.

2. The apparatus of claim 1, wherein accessing the at least one enterprise service to which the user is subscribed and obtaining the identification of content therefrom comprises:
accessing an enterprise content curation service and obtaining therefrom an identification of documents that are trending around the user.

3. The apparatus of claim 1, wherein accessing the at least one enterprise service to which the user is subscribed and obtaining the identification of content therefrom comprises:
accessing at least one enterprise productivity software service and obtaining therefrom an identification of documents that the user has worked on.

4. The apparatus of claim 1, wherein accessing the at least one enterprise service to which the user is subscribed and obtaining the identification of content therefrom comprises:
accessing an enterprise social networking service and obtaining therefrom an identification of content that has been shared by persons to whom the user is connected via the enterprise social networking service.

5. The apparatus of claim 1, wherein the operations further include:
receiving the new tab page framework from the directory service.

6. The apparatus of claim 1, wherein querying the directory service further comprises querying the directory service to obtain the at least the portion of the information relating to the user and wherein the operations further include:
dynamically generating the new tab page framework based on the at least the portion of the information about the user.

7. The apparatus of claim 6, wherein dynamically generating the new tab page framework based on the at least the portion of the information relating to the user comprises:
adding one or more channels of information to the new tab page framework based on one or more enterprise services to which the user is subscribed.

8. The apparatus of claim 6, wherein dynamically generating the new tab page framework based on the at least the portion of the information relating to the user comprises:
adding one or more channels of information to the new tab page framework based on the enterprise account associated with the user.

9. The apparatus of claim 1, wherein the operations further include:
including in the new tab page framework one or more elements that a user may interact with to cause one or more channels of information to be removed therefrom.

10. The apparatus of claim 1, wherein querying the directory service further comprises querying the directory service to obtain an identification of an enterprise with which the user is associated and wherein the operations further include:
obtaining an identification of content that relates to the enterprise from an online news service or an online search service; and
including in the new tab page framework the content that relates to the enterprise or one or more links for accessing the content that relates to the enterprise.

11. The apparatus of claim 1, wherein querying the directory service further comprises querying the directory service to obtain information indicative of an industry in which the user is employed and wherein the operations further include:

obtaining an identification of content that relates to the industry from an online news service or an online search service; and including in the new tab page framework the content that relates to the industry or one or more links for accessing the content that relates to the industry.

12. The apparatus of claim 1, wherein querying the directory service further comprises querying the directory service to obtain an identification of one or more web sites and wherein the operations further include:

including in the new tab page framework one or more links for accessing each of the one or more web sites.

13. The apparatus of claim 1, wherein the operations further include:

including a Rich Site Summary (RSS) feed within the new tab page framework, the RSS feed providing access to content related to the enterprise.

14. The apparatus of claim 1, wherein at least one of the directory service and the at least one enterprise service comprises a cloud-based service.

15. The apparatus of claim 1, wherein the at least one enterprise service comprises one or more of:

a productivity software service;
a content curation service;
a social networking service;
a content or document management service; and
a file hosting service.

16. A method for generating a new tab page that is performed by a web browser executing on a computing device, comprising:

determining that a user of the web browser is associated with an enterprise network account;

querying a directory service to obtain information relating to the user in response to determining that the user is associated with the enterprise network account, the information relating to the user including information indicative of at least one of an enterprise or an industry with which the user is associated;

obtaining an identification of content that relates to the enterprise or the industry from an online service;

including in a new tab page framework the content that relates to the enterprise or the industry or one or more links for accessing the content that relates to the enterprise or the industry, the new tab page framework organizing the content or the one or more links using a layout that groups the content or the one or more links into logical categories;

rendering the new tab page framework within a graphical user interface of the web browser; and automatically modifying the new tab page framework based on a frequency of interaction between the user and at least one of the logical categories or an item of content included in at least one of the of the logical categories, or a link included in at least one of the logical categories.

17. The method of claim 16, wherein obtaining the identification of the content that relates to the enterprise or the industry from the online service comprises:

obtaining the identification of the content that relates to the enterprise or to the industry from one or more of an online news service and an online search service.

18. A method for providing content recommendations by a web browser executing on a computing device, comprising:

determining that a user of the web browser is logged into an enterprise network;

based at least on determining that the user of the web browser is logged into the enterprise network, identifying one or more first network-accessible resources that are internal with respect to the enterprise network and that are related to the user;

including in a new tab page framework the identified one or more first network-accessible resources or one or more links for accessing the identified one or more first network-accessible resources, the new tab page framework being dynamically generated to include the identified one or more first network-accessible resources or the one or more links for accessing the identified one or more first network-accessible resources, the new tab page framework organizing the identified one or more first network-accessible resources or the one or more links using a layout that groups the identified one or more first network-accessible resources or the one or more links into logical categories;

rendering the new tab page framework via a graphical user interface of the web browser; and automatically modifying the new tab page framework based on an interaction between the user and one or more elements of the new tab page framework that enable the user to provide feedback with regard to at least one of the logical categories.

19. The method of claim 18, further comprising:

presenting one or more links for accessing one or more second network-accessible resources that are external with respect to the enterprise network to the user.

20. The method of claim 19, wherein presenting the one or more links for accessing the one or more second network-accessible resources to the user comprises:

presenting the one or more links for accessing the one or more second network-accessible resources to the user via a search box drop-down menu.

* * * * *